United States Patent [19]

Hopkinson

[11] 4,316,086
[45] Feb. 16, 1982

[54] METHOD AND APPARATUS FOR MEASURING NEUTRON CHARACTERISTICS OF MATERIAL SURROUNDING A BOREHOLE

[75] Inventor: Eric C. Hopkinson, Houston, Tex.
[73] Assignee: Dresser Industries, Inc., Dallas, Tex.
[21] Appl. No.: 172,605
[22] Filed: Jul. 28, 1980
[51] Int. Cl.³ .............................................. G01V 5/00
[52] U.S. Cl. ..................................... 250/262; 250/269
[58] Field of Search .............. 250/261, 262, 264, 265, 250/266, 269, 270

[56] References Cited

U.S. PATENT DOCUMENTS

| | | | |
|---|---|---|---|
| 3,379,882 | 4/1968 | Youmans | 250/270 X |
| 3,379,884 | 4/1968 | Youmans | 250/270 X |
| 3,691,378 | 9/1972 | Hopkinson et al. | 250/270 X |
| 3,706,884 | 12/1972 | Youmans | 250/269 X |
| 4,152,590 | 5/1979 | Smith, Jr. et al. | 250/270 X |
| 4,157,469 | 6/1979 | Randall | 250/269 X |

Primary Examiner—Davis L. Willis
Attorney, Agent, or Firm—Richard M. Byron; Patrick H. McCollum

[57] ABSTRACT

A pulsed source of fast neutrons and a radiation detector system are utilized in a well logging instrument, the detector being responsive to the thermal neutron population decay rate. The inverse of the decay rate is proportional to the measured macroscopic neutron absorption cross-section (Sigma) of the surrounding formations. A first Sigma is measured by taking the natural logarithm of the ratio of the detected radiation counts occurring within two measurement intervals. A second Sigma is measured by taking the natural logarithm of the ratio of the detected radiation counts occurring within a second pair of measurement intervals. The first Sigma value is recorded when the Sigma value falls below a preselected limit and the second Sigma value is recorded when the formation Sigma value is above the preselected limit. Thus, the Sigma log is a composite of the two Sigma measurements.

19 Claims, 8 Drawing Figures

METHOD AND APPARATUS FOR MEASURING NEUTRON CHARACTERISTICS OF MATERIAL SURROUNDING A BOREHOLE

BACKGROUND OF THE INVENTION

This invention relates, in general, to radioactivity well logging, and more particularly to methods and apparatus for determining the macroscopic thermal neutron absorption cross-section of the formations surrounding a borehole as determined by radiation measurements.

It is well known to make a log of the various earth formations traversed by a borehole by passing a source of high energy neutrons through the borehole to bombard the surrounding earth and by accompanying the neutron source with a radiation detector which is responsive to radiation resulting from such bombardment. The logging instrument is composed of an elongated pressure-resistant housing containing the neutron source which is usually located adjacent one end and one or more radiation detectors spaced in the housing at a preselected distance from the source. The detector is preferably adapted to generate electrical pulses corresponding to detected radiations, these electrical pulses being coupled to the cable for transmission to electronics measuring equipment located of the surface of the earth.

When a neutron emanates from the source, it interacts with the materials present in the borehole and formation and are slowed down. After the neutrons are thermalized, they are captured by atoms in the earth formations placing those atoms in an excited state, gamma radiations are emitted and the atoms return to a stable state. The "capture" gamma rays are detected by the detector in the logging instrument.

It is well known in the art of radioactivity well logging, for example, as illustrated and described in U.S. Pat. Nos. 3,379,882 and 3,379,884 which issued to Arthur H. Youmans and each of which is assigned to the assignee of the present invention, to measure the macroscopic thermal neutron capture cross-section [Sigma ($\Sigma$)] of the formations surrounding a borehole. This prior art method makes such a measurement or computation by measuring the decline of the thermal neutron population by measuring the decline of the thermal neutron population in such formations within a fixed period of time following the emission of a burst of high energy neutrons and by dividing the radiations indicative of such thermal neutrons into two equal groups and computing the rate of change over the selected time interval.

It has been discovered, however, that when using two measurement intervals of fixed periods following the neutron burst the resulting Sigma measurement can have unacceptable statistical variation when the instrument encounters formations of high Sigma value.

Accordingly, the present invention overcomes the deficiencies of the prior art by providing method and apparatus for measuring the macroscopic thermal neutron capture cross-section using optimized measurement intervals.

SUMMARY OF THE INVENTION

In the preferred embodiment of the present invention, a measurement of the decline of the thermal neutron population in the formation is derived by counting the detected radiation within a first pair of measurement intervals occurring at a fixed time after the neutron burst. A ratio of the two counting rates provide the rate of change over the selected time interval. The counting ratio is converted into a natural logarithm representative of the Sigma calculation.

A second measurement of the decline of the thermal neutron population in the formation is derived by counting the detected radiation within a second pair of measurement intervals occurring over a different time span after the neutron burst than the first pair of measurement intervals. A ratio of the counting rates provide the rate of change over the second time interval. The ratio is taken of the two counting rates within these intervals and is converted into the natural logarithm thereof. The first Sigma measurement is recorded whenever the formation Sigma is below a preselected value and the second Sigma is substituted therefore whenever the formation Sigma exceeds the preselected limit. In the preferred embodiment, the first Sigma measurement will be recorded when the formation Sigma is from, for example, between 0-20 Sigma units and the second Sigma measurement will be recorded when the formation Sigma is above 20 Sigma units.

Accordingly, it is a feature of the present invention to provide new and improved methods and apparatus for determining a macroscopic thermal neutron cross-section of formations surrounding earth boreholes;

it is also a feature of the present invention to provide new and improved methods and apparatus for recording a formation macroscopic thermal neutron cross-section utilizing two pairs of measurement intervals;

it is yet another feature of the present invention to provide methods and apparatus for utilizing a macroscopic thermal neutron cross-section measurement for selecting between alternate Sigma measurements to be recorded; and still another feature of the present invention is to calculate a first formation Sigma based on a ratio of the counting rates within two contiguous fixed measurement intervals and to calculate a second formation Sigma based on a ratio of the counting rates within a second pair of contiguous fixed measurement intervals and to select which measurement to be recorded based on the formation Sigma value.

These and other features and advantages of the present invention can be understood from the following description of the techniques of producing the invention described in conjunction with the following drawings.

DETAILED DESCRIPTION OF THE DRAWINGS

Figure 1:
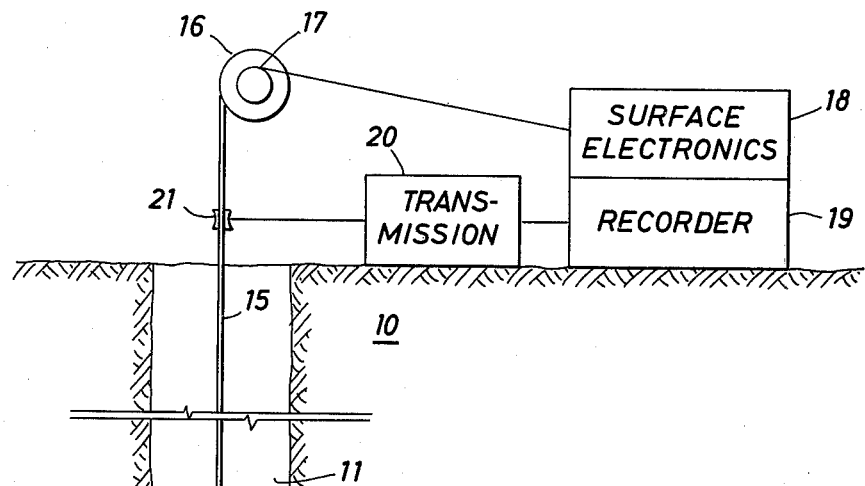
FIG. 1 is a side elevational view, partly in cross-section, of a radioactivity logging system in accordance with the present invention.

Referring now to the drawings in detail, particularly to FIG. 1, there is illustrated schematically a radioactivity well surveying operation in which a portion of the earth's surface 10 is shown in vertical section. An earth borehole 11 penetrated the earth's surface and may or may not be cased. Disposed within the well is subsurface instrument 12 of the well logging system. Subsurface instrument 12 comprises a detecting system 13 and a pulsed neutron source 14 for irradiating the formation with high energy neutrons. Cable 15 suspends the instrument 12 in the well and contains the required conductors for electrically connecting the instrument with the surface apparatus. The cable 15 is wound on or unwound from drum 16 in raising and lowering the instrument 12 to traverse the well.

In making a radioactivity log of a well, instrument 12 is caused to traverse the well. Thereby neutrons from source 14 pulsedly irradiate the formations surrounding the borehole, and radiations influenced by the formations are detected by the detecting system 13. The resultant signal is sent to the surface through conductors within cable 15. Through slip rings and brushes 17 on the end of drum 16, the signals are coupled into surface electronics 18. After processing by the circuitry hereinafter described and illustrated, the resulting information is recorded on recorder 19. Recorder 19 is driven through transmission 20 by a measuring reel 21 over which cable 15 is drawn so that recorder 19 moves in correlation with the depth as instrument 12 traverses the well. The elements are shown diagrammatically, and it is understood that the associated circuits and power supplies are provided in a conventional manner. It is also understood that the housing for instrument 12 is constructed to withstand the pressures and mechanical and thermal abuses encountered in logging a deep well and to provide adequate space within it to house the necessary apparatus and to permit the transmission of radiation therethrough.

In the operation of the apparatus of FIG. 1, the source 14 is periodically activated, for example, every eleven hundred microseconds causing the formation to be irradiated with high energy neutrons. Gamma rays are detected by the detector system 13 which are indicative of thermal neutron reactions. The number of gamma rays present at any time is proportional to the thermal neutron population around the instrument 12. The decay rate of the neutron population is an exponential function. Electrical signals are transmitted up cable 15 indicative of such detected gamma radiation.

In a homogeneous medium, the rate of thermal neutron absorption is defined by the following equation:

$$N_2 = N_1 e^{-\Sigma V \Delta t} \tag{1}$$

where $N_1$, $N_2$ are the number of thermal neutrons in existence at times $t_1$, and $t_2$; $\Delta t$ is the time between measurements $(t_2 - t_1)$; V is the velocity of thermal neutrons; $\Sigma$ is the thermal neutron capture cross-section of the medium; and e is the Napierian logarithm base.

Thermal neutron capture cross-section of the medium is determined from the rate of absorption as follows:

$$\Sigma = (1/V\Delta t) \ln(N_1/N_2) \tag{2}$$

Figure 5A:
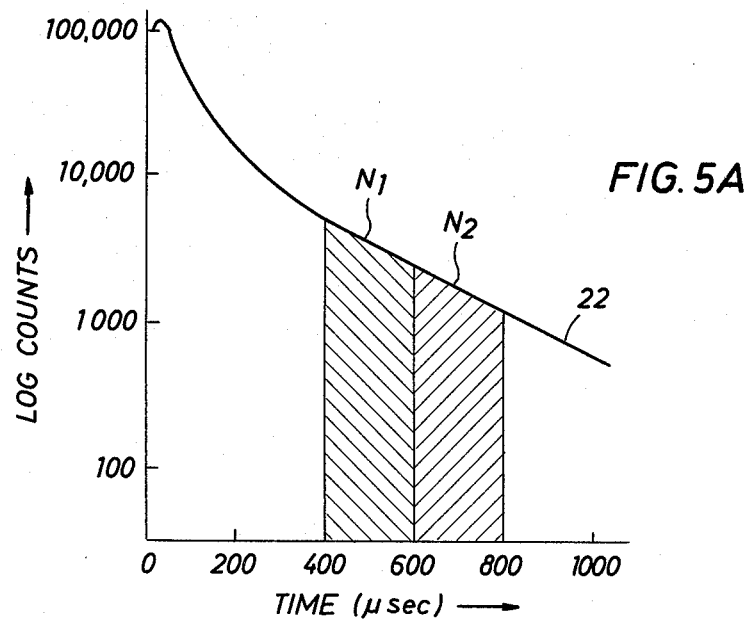
FIGS. 5A and 5B are schematic representations of the characteristic decay of a thermal neutron population following a burst of fast neutrons within a well and a method of utilizing two pair of gates to provide alternate measurements of the rate of decline of the neutron population.
Figure 5B:
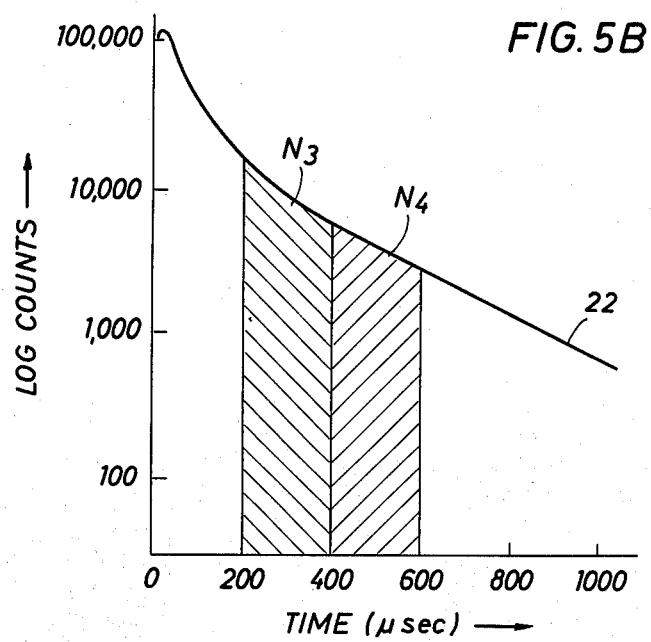

Referring now to FIGS. 5A and 5B, there is graphically illustrated a curve 22 which is representative of the rate of neutron decay as measured by detector system 13 in accordance with the present invention. With the data which produces such curves, the rate of decline of the thermal neutron population is computed by measuring the integrated radiation counting rate under the curve 22 occurring during measure intervals $N_1$ and $N_2$ and during intervals $N_3$ and $N_4$. $\Delta t$ is measured between the midpoints or starts of the measurement intervals and V is set to a constant value of 2200 meters/second. This is sufficient data to calculate Sigma.

As illustrated by decay rate curve 22, the initial rate of neutron decay is relatively complex. The initial rate of decrease of neutrons is a function of the relation between borehole materials and the Sigma value of the formation. These borehole materials include the tool housing, the fluid in the casing, the casing, and the cement or fluid around the casing. After some time period these transient influences diminish and the neutron decay curve 22 becomes exponential and is substantially controlled by the formation capture cross-section. Since the rate of neutron decay is exponential, a straight line on a semilogarithmic scale, only two time referenced measurements are necessary to determine Sigma.

Figure 2:
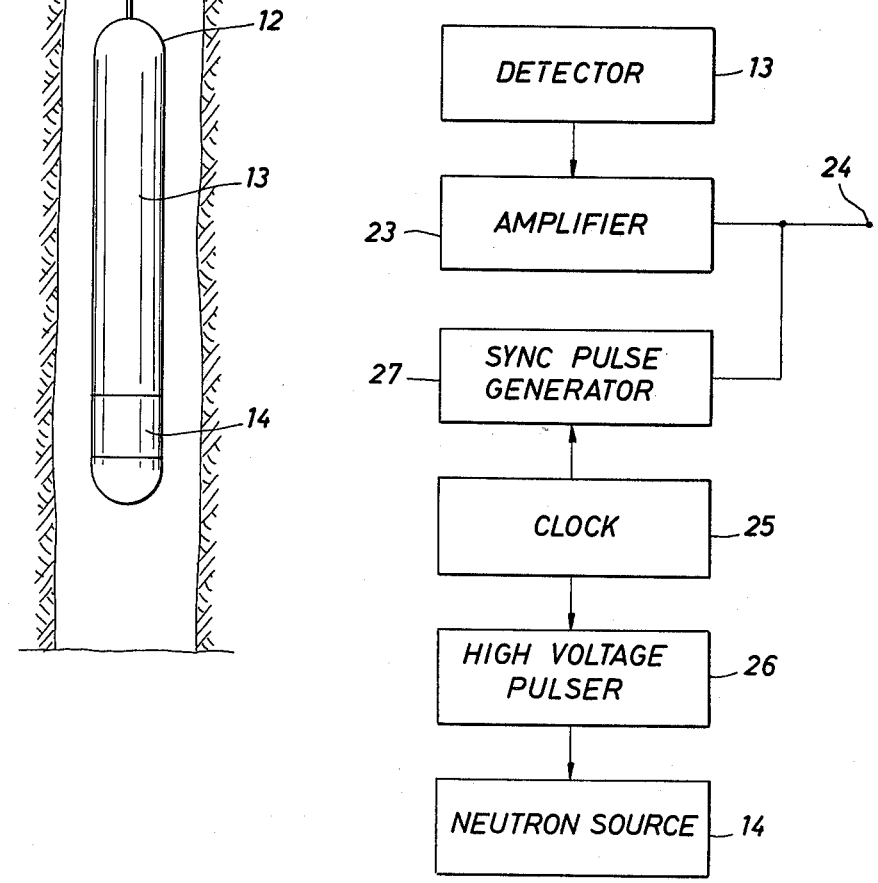
FIG. 2 illustrates in block diagram a portion of the subsurface electronics in accordance with the present invention.

Referring now to FIG. 2, there is illustrated the subsurface circuitry for generating the sync signals and signal pulses hereinafter illustrated and described. The detector 13 is coupled to an amplifier 23, whose output is connected to junction 24. A clock circuit 25 has its output connected to a high voltage pulser 26 which drives a conventional neutron source 14. In the preferred embodiment of the present invention, source 14 is a conventional D-T accelerator producing high energy 14 Mev neutrons at a rate as determined by the clock 25. The discrete burst of neutrons occur on the order of 1100 microseconds apart and are generally of 10 to 50 microseconds duration. Clock circuit 25 also drives a sync generator 27 having its output connected to junction 24. The junction 24 is connected to a conductor of cable 15 and serves to carry the signals to surface electronics 18 for processing.

In the operation of the circuitry and apparatus illustrated in FIG. 2, the clock 25 causes high voltage to be applied to neutron source 14 to generate discrete bursts of neutrons, each such burst being separated by approximately 1100 microseconds. The detector 13 detects gamma radiation resulting from the capture of thermal neutrons occasioned in the formation surrounding the borehole by neutron source 14. The detected pulses from detector 13 are immediately amplified by amplifier 23 and combined with the sync pulses, generated by sync pulse generator 27 in response to clock 25, for transmission to the earth's surface.

Figure 3:
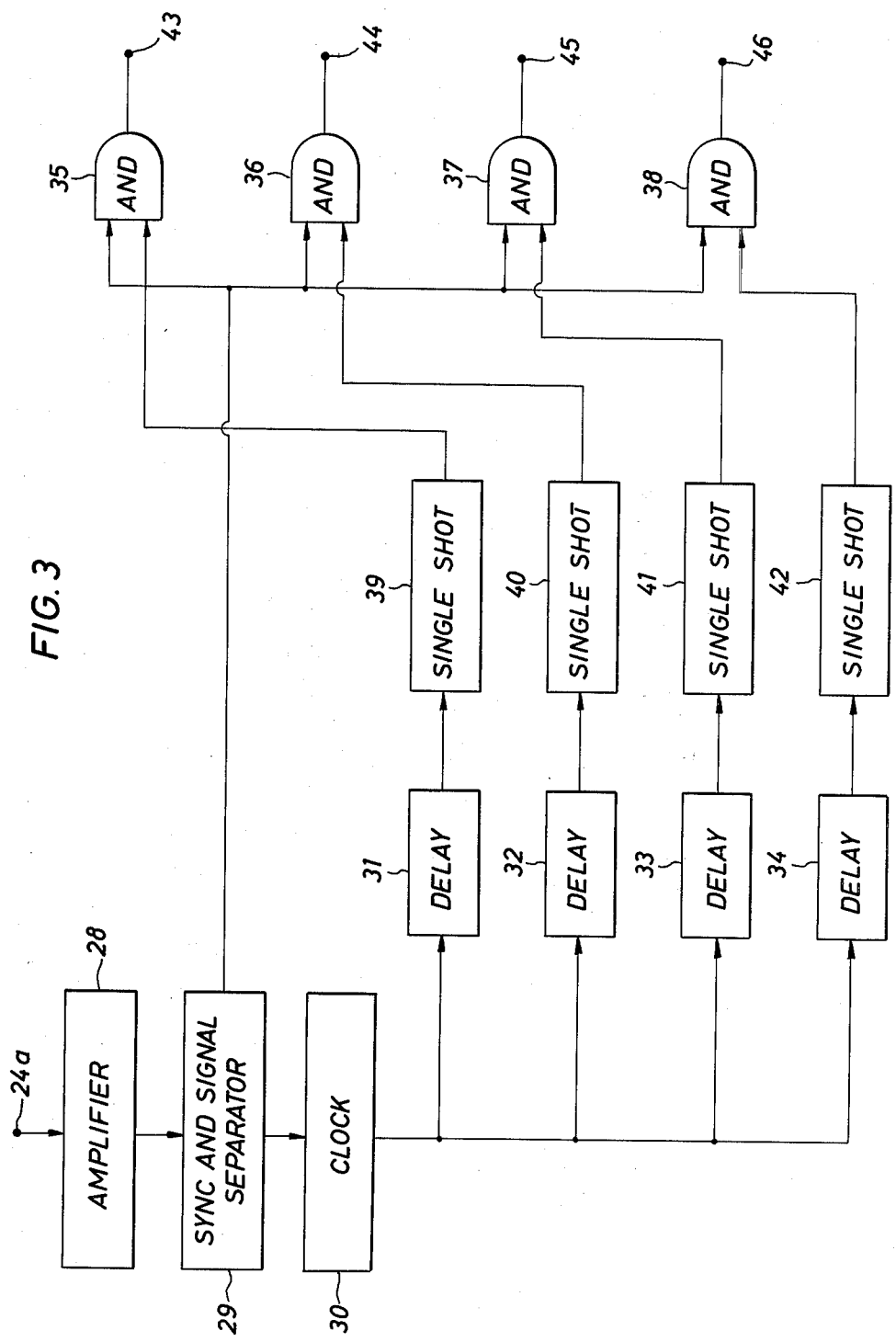
FIG. 3 illustrates in block diagram additional surface electronics utilized in accordance with the present invention.

Referring now to FIG. 3, a portion of the surface electronics shown generally by the reference numeral 18 in FIG. 1 is shown in greater detail. The junction 24a corresponds to the junction 24 in the subsurface circuitry. Junction 24a is coupled through an amplifier 28 to a conventional sync and signal separator circuit 29 which separates the sync signal from the amplified signal pulses. The separation can be achieved by any of the conventional circuit devices, for example, through pulse height discrimination. The sync output of the separator circuit 29 is coupled into clock circuit 30 the output of which is connected to the input of delay circuits 31, 32, 33 and 34. The signal output of separator circuit 29 is coupled into one input of a two-input AND gates 35, 36, 37 and 38.

Delay circuit 31 is set to have a fixed delay, for example, 200 microseconds and has the output connected to single shot multivibrator 39. Delay circuit 32 is set to have a delay of 400 microseconds and has the output connected to single shot multivibrator 40. Delay circuit 33 is set to have a delay of 400 microseconds and has the output connected to single shot multivibrator 41. Delay circuit 34 is set to have a delay of 600 microseconds and has the output connected to single shot multivibrator 42. Each of the single shot multivibrators 39, 40, 41 and 42 produces a square wave of 200 microseconds duration.

The output of single shot multivibrator 39 is connected to the second input of AND gate 35 while the output of single shot multivibrator 40 is connected to the second input of AND gate 36. The output of single shot multivibrator 41 is connected to the second input of AND gate 37 while the output of single shot multivibrator 42 is connected to the second input of AND gate 38. The output of AND gate 35 is connected to junction 43 and the output of AND gate 36 is connected to junction 44. The outputs of AND gate 37 is connected to junction 45 and the output of AND gate 38 is connected to junction 46.

In the operation of the surface electronics illustrated in FIG. 3, the sync signal and the detected radiation pulses are provided by subsurface instrument 12 to amplifier 28. The amplified output of amplifier 28 is coupled to sync and signal circuitry 29 the sync output of which is coupled to clock circuit 30 and the signal output representative of the detected radiations is connected to one input of AND gates 35, 36, 37 and 38. The clock output signal from clock circuit 30 is delayed 200 microseconds by delay circuit 31 and is delayed 400 microseconds by delay circuit 32. Additionally, the clock output signal from clock circuit 30 is delayed 400 microseconds by delay circuit 33 and is delayed 600 microseconds by delay circuit 34. The delayed clock signal output from delay circuit 31 is coupled to single shot multivibrator 39 while the delayed clock signal output from delay circuit 32 is coupled to single shot multivibrator 40. The delayed clock signal output from delay circuit 31 is coupled to single shot multivibrator 41 while the delayed clock signal output from delay circuit 34 is coupled to single shot multivibrator 42.

Single shot multivibrator 39, 40, 41 and 42 are set to produce a square wave output of 200 microseconds in duration. The output of single shot multivibrator 39 provides the second input to AND gate 35 whereas the output of single shot multivibrator 40 provides the second input to AND gate 36. The output of single shot multivibrator 41 provides the second input to AND gate 37 and the output signal of single shot multivibrator 42 provides the second input to AND gate 38. Thus, AND gate 35 will pass all the detected radiation occurring in the time interval from 200-400 microseconds following the sync pulse, while AND gate 36 will pass all the detected radiation occurring in the 400-600 microsecond interval. AND gate 37 will pass all the detected radiation occurring in the 400-600 microsecond interval and AND 38 will pass all the detected radiation occurring in the 600-800 microsecond interval. The respective radiation intervals are illustrated by measurement intervals $N_1$, $N_2$, $N_3$ and $N_4$ of FIG. 5. The outputs of AND gate 35, AND gate 36, AND gate 37 and AND gate 38 are connected to junction 43, 44, 45 and 46 respectively.

Figure 4:
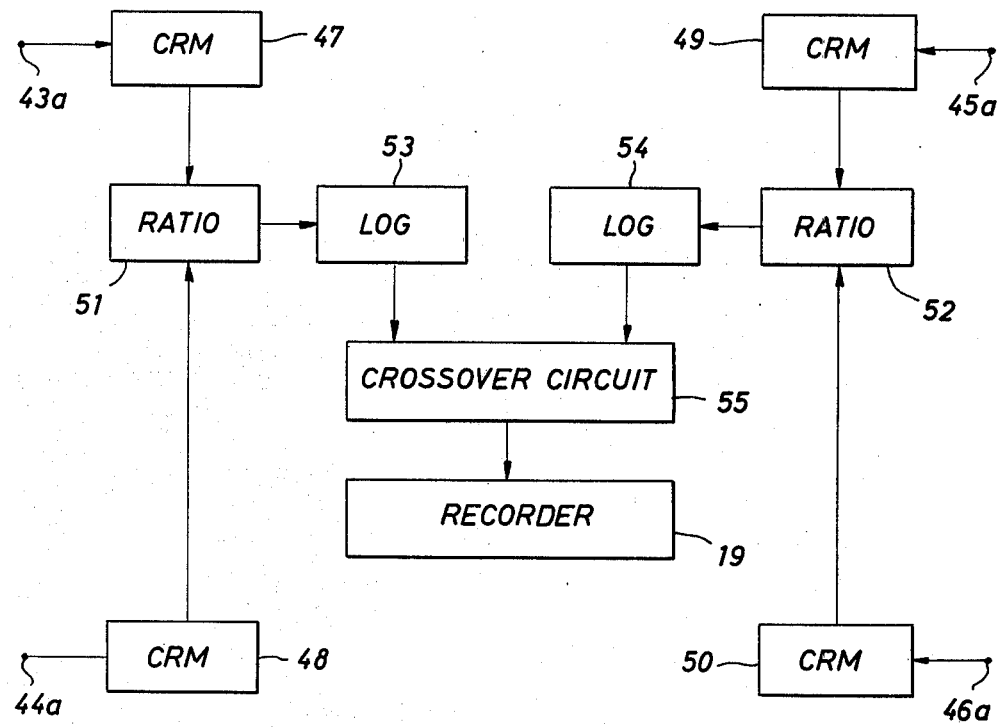
FIG. 4 illustrates in block diagram additional surface electronics utilized in accordance with the present invention.

Referring now to FIG. 4, junctions 43a, 44a, 45a and 46a correspond to junctions 43, 44, 45 and 46 of FIG. 3. The detected radiations within the time interval provided by AND gate 35 are coupled to count rate meter 47, the detected radiations within the time interval provided by AND gate 36 are coupled to count rate meter 48, the detected radiations within the time interval provided by AND gate 37 are coupled to count rate meter 49 and the detected radiations within the time interval provided by AND gate 38 are coupled to count rate meter 50. Count rate meters 47 and 48 are connected to ratio circuit 51 and count rate meters 49 and 50 are connected to ratio circuit 52. The output of ratio circuit 51 is coupled to the input of logarithmic circuit 53 and the output of ratio circuit 52 is coupled to logarithmic circuit 54. The outputs of logarithmic circuits 53 and 54 provide the input to crossover circuit 55 the output of which is passed to recorder 19.

In the operation of the circuitry of FIG. 4, the detected radiation pulses counted by count rate meter 47 represent all the detected radiations occurring within a first time interval, represented by $N_3$ of FIG. 5B, and the pulses counted by count rate meter 48 represent all the detected radiations occurring within a second time interval, represented by $N_4$ of FIG. 5B. Ratio circuit 51 provides a ratio of the first and second gate signals. The logarithmic circuit 53 provides a natural logarithmic signal of the ratio signal from ratio circuit 51. The output of logarithmic circuit 53 is a first Sigma value of the formation.

The detected radiation pulses counted by count rate meter 49 represent all the detected radiations occurring within a third time interval, $N_1$ of FIG. 5A, and the pulses counted by count rate meter 50 represent all the detected radiations occurring within a fourth time interval, $N_2$ of FIG. 5A. Ratio circuit 52 provides a ratio of the third and fourth gate signals. The logarithmic circuit 54 provides a natural logarithmic signal of the ratio signal from ratio circuit 52. The output of logarithmic circuit 54 is a second Sigma value of the formation. Crossover circuit 55 is preset so when the measured formation Sigma is below a predetermined value, for example, 20 Sigma units, the measurement provided by logarithmic circuit 54 is passed to recorder 19 and when the formation Sigma value exceeds 20 Sigma units the measurement provided by logarithmic circuit 53 is passed to recorder 19.

Returning now to FIG. 5 and recalling the previous discussions, the rate of neutron decay curve 22 has an initial rate of neutron decay which is not an exponential function but rather is relatively a complex function caused in part by borehole influences. After some short period of time these disturbing influence become negligible and the rate of decay is substantially controlled by the formation capture cross-section. The point at which the undesirable influences become negligible is related to the rate of decline in the neutron population.

In normal and low Sigma formations the value for Sigma is calculated and recorded based upon a ratio of the counting rates of intervals $N_1$ and $N_2$. However, in an effort to increase statistical accuracy by increasing the counting rates, when a high Sigma formation is encountered the Sigma calculation which is recorded is the ratio of the counting rates of intervals $N_3$ and $N_4$. By alternating between two Sigma measurements based upon the formation Sigma value there is provided a log of increased quality.

Figure 6A:
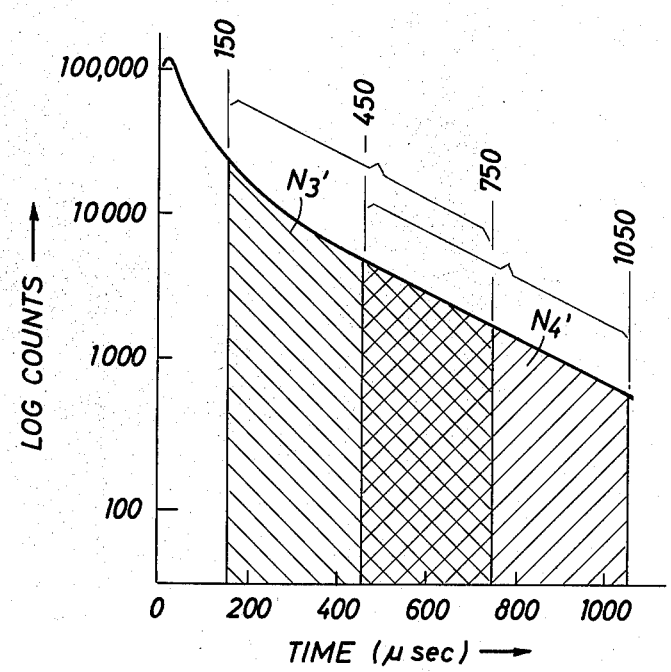
FIGS. 6A and 6B are schematic representations of the characteristic decay of a thermal neutron population following a burst of fast neutrons within a well and an alternate method of utilizing two pair of gates to provide measurements of the rate of decay of the neutron population.
Figure 6B:
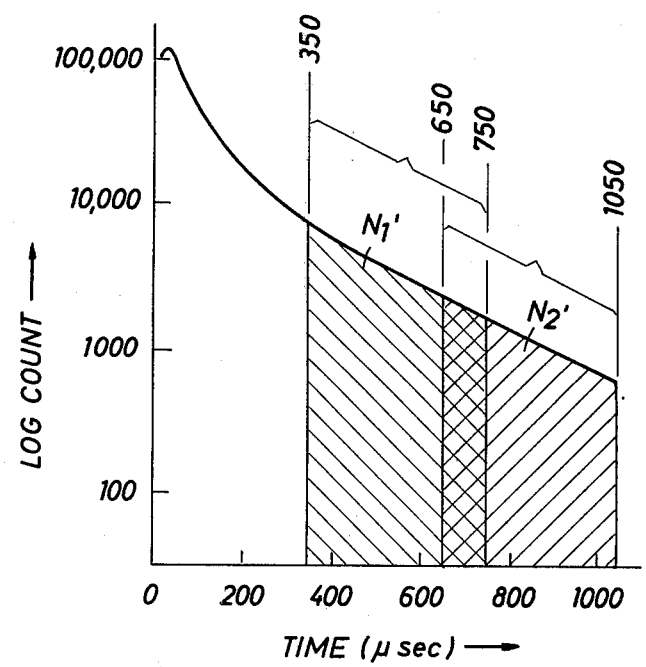

An alternate embodiment of the present invention is illustrated in FIGS. 6A and 6B where in the Sigma measurement intervals are overlapping in time. By selection of the desired delay times of delay circuits 31, 32, 33 and 34 along with selection of the gating interval as established by single shot multivibrators 39, 40, 41 and 42 the counting intervals of FIG. 6 can be derived. In the embodiment illustrated the Sigma measurement which is recorded for low and normal Sigma formations, 0-20 Sigma units, is derived from the ratio of the counting rate of intervals $N_1'$ and $N_2'$, and the Sigma measurement to be recorded for high Sigma formations is derived from the ratio of the counting rates of intervals $N_3'$ and $N_4'$. As illustrated in FIG. 6, it is contemplated that interval $N_1'$ is from 350-750 microseconds, interval $N_2'$ is from 650-1050 microseconds, interval $N_3'$ is from 150-750 microseconds and interval $N_4'$ is from 450-1050 microseconds.

Thus, there has been described and illustrated herein a new and improved method and apparatus for measuring thermal neutron decay times. Those skilled in the art will recognize that numerous other variations and modifications may be made without departing from the scope of the present invention. For example, measurement intervals $N_1$ and $N_4$ of FIG. 5, need not be two separate and distinct time gates but rather could be a single gate used in conjunction with intervals $N_2$ and $N_3$ to derive the desired counting rates. Likewise, the present invention could be applied when using a dual detector neutron logging instrument.

The embodiments of the invention in which an exclusive property or privilege is claimed are defined as follows:

1. A method for logging the formations surrounding a borehole, comprising the steps of:
pulsedly irradiating said formations with discrete bursts from a source of high energy neutrons;
detecting radiations emanating from said irradiated formations at a detector spaced from said source;
generating from said detected radiations first and second measurements of the macroscopic thermal neutron absorption cross-section of said formations; and
selectively recording one of said measurements based upon a functional relationship to a predetermined reference value.

2. The logging method of claim 1 wherein said predetermined reference value is functionally related to the neutron absorption cross-section of said formations.

3. The logging method of claim 2 wherein said first measurement is selectively recorded when said formation neutron absorption cross-section is below 20 Sigma units and said second measurement is selectively recorded when said formation neutron absorption cross-section is above 20 Sigma units.

4. The logging method of claim 1 wherein said first measurement of the macroscopic thermal neutron absorption cross-section comprises the steps of:
measuring the detected radiation during first and second time intervals following a burst from said source; and
deriving a ratio of said radiation measured during said first and second intervals, said ratio being substantially representative of the decline in the neutron population in said formations.

5. The logging method of claim 4 wherein said second measurement of the macroscopic thermal neutron absorption cross-section comprises the steps of:
measuring the detected radiation during third and fourth time intervals following a burst from said source; and
deriving a ratio of said measured radiation during said third and fourth intervals, said ratio being substantially representative of the decline of the neutron population in said formation.

6. The logging method of claim 5 wherein said third time interval is from between 200-400 microseconds after said burst of high energy neutrons and said fourth time interval is from between 400-600 microseconds after said burst of high energy neutrons.

7. The logging method of claim 5 wherein said third time interval is from between 150-750 microseconds aftersaid burst of high energy neutrons and said fourth time interval is from between 450-1050 microseconds after said burst of high energy neutrons.

8. The logging method of claim 4 wherein said first time interval is from between 400-600 microseconds after said burst of high energy neutrons and said second time interval is from between 600-800 microseconds after said burst of high energy neutrons.

9. The logging method of claim 4 wherein said first time interval is from between 350-750 microseconds after said burst of high energy neutrons and said second time interval is from between 650-1050 microseconds after said burst of high energy neutrons.

10. A method for logging the formations surrounding an earth borehole, comprising the steps of:
irradiating said formations with high energy neutrons;
detecting radiations emanating from said irradiated formations;
measuring the detected radiation during first, second, third and fourth time intervals;
generating from said measured radiation during said first and said second time intervals a first electrical signal functionally related to the macroscopic thermal neutron absorption cross-section of said formations;
generating from said measured radiation during said third and said fourth time intervals a second electrical signal functionally related to the macroscopic thermal neutron absorption cross-section of said formations; and
selectively recording one of said generated electrical signals, said selection based on the value of said first electrical signal.

11. The logging method of claim 10 wherein said first electrical signal is recorded when the value of said first electrical signal is from between 0-20 Sigma units and said second electrical signal is recorded when the value of said first electrical signal is above 20 Sigma units.

12. Apparatus for logging the formations surrounding an earth borehole, comprising:
a pulsed source for emitting bursts of high energy neutrons;
a radiation detector for detecting radiation emanating from said formations;
circuit means for generating from said detected radiations first and second measurement of the macroscopic thermal neutron absorption cross-section of said formations; and circuit means for selectively recording one of said measurements of the macroscopic thermal neutron absorption cross-section of said formations, said selection based on the macroscopic thermal neutron absorption cross-section of said formation.

13. The apparatus of claim 12 wherein said circuit means for selectively recording comprises means for recording said first measurement when said neutron absorption cross-section is below 20 Sigma units and means for recording said second measurement when said neutron absorption section is above 20 Sigma units.

14. The apparatus of claim 12 wherein said circuit means for generating said first measurement comprises:

circuit means for measuring the detected radiation during first and second time intervals, and circuit means for deriving a ratio of said measured radiation during first and second intervals, said ratio being substantially representative of the decline in the neutron population in said formations.

15. The apparatus of claim 14 wherein said circuit means for generating said second measurement comprises:

circuit means for measuring the detected radiation during third and fourth time intervals; and circuit means for deriving the ratio of said measured radiation during said third and fourth intervals, said ratio being substantially representative of the decline in the neutron population in said formations.

16. The apparatus of claim 15 wherein said first time interval is from between 200-400 microseconds after a burst from said source and said second time interval is from between 400-600 microseconds after said burst from said source.

17. The apparatus of claim 15 wherein said first time interval is from between 150-750 microseconds after a burst from said source and said second time interval is from between 450-1050 microseconds after said burst from said source.

18. The apparatus of claim 14 wherein said first time interval is from between 400-600 microseconds after a burst from said source and said second time interval is from between 600-800 microseconds after said burst from said source.

19. The apparatus of claim 14 wherein said first time interval is from between 350-750 microseconds after a burst from said source and said second time interval is from between 650-1050 microseconds after said burst from said source.

* * * * *